(12) United States Patent
Tran et al.

(10) Patent No.: US 11,836,150 B2
(45) Date of Patent: Dec. 5, 2023

(54) SYSTEM AND ARCHITECTURE FOR STANDARDIZING AND CENTRALIZING DATA MOVEMENT BETWEEN SYSTEMS

(71) Applicant: Salesforce, Inc., San Francisco, CA (US)

(72) Inventors: Leo Duy Tran, Piedmont, CA (US); David Angulo, Boulder, CO (US); Edward Li, Alameda, CA (US)

(73) Assignee: Salesforce, Inc., San Francisco, CA (US)

( * ) Notice: Subject to any disclaimer, the term of this patent is extended or adjusted under 35 U.S.C. 154(b) by 98 days.

(21) Appl. No.: 17/356,113

(22) Filed: Jun. 23, 2021

(65) Prior Publication Data

US 2022/0414115 A1   Dec. 29, 2022

(51) Int. Cl.
*G06F 16/25* (2019.01)
*G06F 16/215* (2019.01)
*G06F 16/21* (2019.01)

(52) U.S. Cl.
CPC .......... *G06F 16/258* (2019.01); *G06F 16/212* (2019.01); *G06F 16/215* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 7,051,334 B1 * | 5/2006 | Porter ................... | G06F 16/254 709/201 |
| 7,730,478 B2 | 6/2010 | Weissman | |
| 8,914,422 B2 | 12/2014 | Hale et al. | |
| 9,774,688 B2 | 9/2017 | Tran et al. | |
| 10,733,212 B2 | 8/2020 | Orun et al. | |
| 10,936,582 B2 | 3/2021 | Tran et al. | |
| 2005/0015439 A1 * | 1/2005 | Balaji ................... | G06F 16/258 709/219 |
| 2009/0112939 A1 * | 4/2009 | Sanghvi ................ | G06F 16/273 |
| 2010/0223100 A1 | 9/2010 | Lee et al. | |
| 2014/0013237 A1 | 1/2014 | Roy-Faderman et al. | |

(Continued)

OTHER PUBLICATIONS

Smith, et al., "Tableau Software and Teradata: the Visual Approach to the Active Warehouse," Tableau Software, Incorporated, Apr. 30, 2008, pp. 1-10.

*Primary Examiner* — Alex Gofman
*Assistant Examiner* — Umar Mian
(74) *Attorney, Agent, or Firm* — Nicholson, De Vos, Webster & Elliott, LLP

(57) ABSTRACT

A method by one or more computing devices to standardize and centralize data movement between systems. The method includes receiving and storing data source information for a logical data source including authentication and authorization information for accessing a plurality of source systems that store data associated with the logical data source, schema information for a first schema used by a first one of the plurality of source systems to store data associated with the logical data source, and process information for a process including job information for a first job of the process that is for importing data associated with the logical data source from the first source system to a staging area. The method further includes executing the process according to the process information for the process.

10 Claims, 7 Drawing Sheets

(56) References Cited

U.S. PATENT DOCUMENTS

| | | | |
|---|---|---|---|
| 2015/0012476 A1* | 1/2015 | Seng | B29C 48/00 |
| | | | 707/601 |
| 2015/0134589 A1* | 5/2015 | Marrelli | G06F 16/254 |
| | | | 707/602 |
| 2019/0114342 A1 | 4/2019 | Orun et al. | |
| 2019/0238653 A1 | 8/2019 | Syomichev et al. | |
| 2020/0097471 A1 | 3/2020 | Tran et al. | |
| 2020/0097476 A1 | 3/2020 | Tran et al. | |
| 2021/0374143 A1* | 12/2021 | Neill | G06F 16/24568 |

* cited by examiner

SYSTEM AND ARCHITECTURE FOR STANDARDIZING AND CENTRALIZING DATA MOVEMENT BETWEEN SYSTEMS

TECHNICAL FIELD

One or more implementations relate to the field of data movement, and more specifically, to a system and architecture for standardizing and centralizing data movement between systems.

BACKGROUND

Many enterprises have multiple systems for storing and managing data. For example, a retailer may have an e-Commerce system that implements a digital storefront, an order management system that manages order processing and shipping, and a data warehouse system that stores archived order history. Also, many enterprises have systems for analyzing their data such as machine learning systems (e.g., to gain insights into their data). These systems benefit most when they have access to as much of the enterprise's data as possible. As such, enterprises typically implement various mechanisms for moving data between multiple systems.

Existing mechanisms for moving data between systems require establishing point-to-point connections between the source systems (the systems from which data is moved from) and the target systems (the systems to which data is moved to) involved in the data movement and separately configuring the data movement for each source-target pair. As a result, there is a burden of configuration each time a new system is introduced, including having to configure common data movement settings such as how to transform the data from a source system into a format that the target system understands.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for standardizing and centralizing data movement between systems. According to some implementations, a data movement system is communicatively coupled to one or more source systems and one or more target systems. A user may configure the data movement system to import data from the source systems to a staging area by providing logical data source information, data mapping information, and process information. The user may also configure the data movement system to export data stored in the staging area to the target systems in a similar manner. The data movement system provides a standardized way to configure data movement between systems, which allows for consistency of configuration and simplifies the configuration learning curve for users. The data movement system also provides a centralized hub for data movement, which avoids the need to create point-to-point connections between each of the source systems and each of the target systems and makes it simpler and more efficient to move data (e.g., data imported from multiple source systems) to multiple target systems. Implementations will now be described with reference to the accompanying figures.

Figure 1:
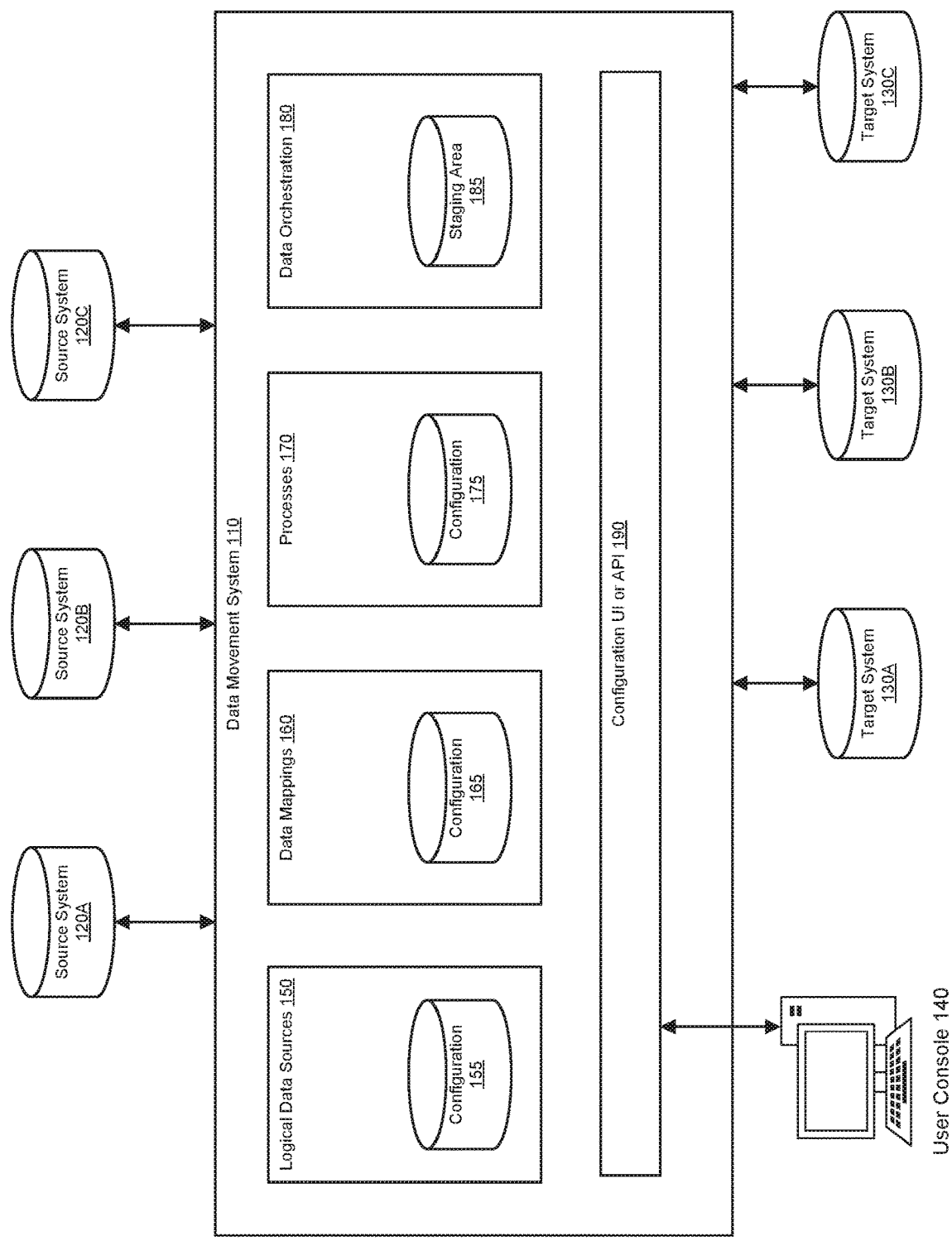
FIG. 1 is a diagram illustrating a system for standardizing and centralizing data movement between systems, according to some example implementations.

FIG. 1 is a diagram illustrating a system for standardizing and centralizing data movement between systems, according to some example implementations. As shown in the diagram, the system includes a data movement system 110 that is communicatively coupled to source systems 120A-C and target systems 130A-C. The data movement system 110 may provide a data movement service that moves data between the source systems 120 and the target systems 130. In the context of data movement, a source system is a system from which data is moved from and a target system is a system to which that data is moved to. As an example that will be used herein throughout the description to help illustrate implementations, source system 120A may be an e-Commerce system that implements a digital storefront, source system 120B may be an order management system that manages order processing and shipping, and source system 120C may be a data warehouse system that stores archived order history. Also, target system 130A may be a machine learning system that uses machine learning techniques to analyze data, target system 130B may be an analytics system that allows business analysts to generate reports and dashboards of key performance indicators, and target system 130C may be a data management system that supports data governance, validation, and reconciliation. While for the sake of example the diagram shows the data movement system 110 being communicatively coupled to three source systems 120 and three target systems 130, it should be understood that the data movement system 110 may be communicatively coupled to any number of source systems 120 and any number of target systems 130. Also, it should be understood that a particular system may act as a source system for certain data movements but act as a target system for other data movements.

Also, as shown in the diagram, the data movement system 110 is communicatively coupled to a user console 140. The data movement system 110 may implement a user interface (UI) and/or application programming interface (API) 190 (or other type of interface) that allows the user console 140 to interface with the data movement system 110. A user (not shown) may operate the user console 140 to access the data movement service provided by the data movement system 110. For ease of description, a user may be described as interacting with the data movement system 110 (e.g., to configure the data movement system 110 to move data). This should be understood to mean that the user operates the user console 140 or otherwise causes the user console 140 to interact with the data movement system 110 (e.g., via the configuration UI/API 190).

In an implementation, a user configures the data movement system 110 to move data by providing information about logical data sources 150, data mappings 160, and processes 170 to the data movement system 110. The data movement system 110 may store information about logical data sources 150, data mappings 160, and processes 170 in configuration storage 155, configuration storage 165, and configuration storage 175, respectively, for reuse. A data orchestration component 180 of the data movement system 110 may execute the processes 170, which may involve importing data from one or more of the source systems 120 to a staging area 185 and/or exporting data from the staging area 185 to one or more of the target systems 130.

A brief introduction to logical data sources 150, data mappings 160, processes 170, and the data orchestration component 180 are provided below.

Logical Data Sources

A logical data source is a logical representation of data that encompasses data stored across multiple systems that represent the same thing. Implementations introduce the concept of logical data sources 150 to decouple the data from the system that the data originates from. Existing data movement solutions typically bundle these concepts together. For example, enterprises typically have to treat order data from an e-Commerce system and order data from a data warehouse system as being separate data (e.g., because they are stored and managed by different systems) even though they represent the same thing (i.e., information about customer orders). Implementations may define a logical data source called "orders" that encompasses order data stored/managed by the e-Commerce system and the order data stored/managed by the data warehouse system. The concept of logical data sources 150 may help a user manage data that may have come from multiple systems but represent the same thing.

Data Mappings

Different systems may use different schemas to store, organize, and/or represent data. Schemas provide contextual and system-specific semantics to raw data. Mappings between schemas can be used to support interoperability of data between systems (e.g., it allows for rationalizing contextually analogous data even if they are captured differently).

Processes

A process may include one or more jobs for moving data between systems. As used herein, a job refers to a unit of work for moving data from/to a particular system (e.g., importing order data from the e-Commerce system). A process may stitch together jobs to form more complex data movements that involve multiple systems (e.g., import order data from the e-Commerce system nightly and export the order data to the machine learning system and the data management system).

Data Orchestration

As mentioned above, the data orchestration component 180 may execute processes 170, which may involve importing data from one or more of the source systems 120 to a staging area 185 and/or exporting data from the staging area 185 to one or more of the target systems 130. The staging area 185 provides a temporary storage location for data that is being moved between systems. Existing data movement solutions move data between systems using a point-to-point model. However, given that most enterprises have to move data between multiple systems, this point-to-point data movement may be inefficient, particularly when it is the same data that needs to be moved between multiple systems. In contrast to existing solutions, some implementations use a hub-spoke model, where the staging area 185 acts as the temporal data hub into which data from source systems 120 can be imported once and then exported to multiple target systems 130.

Figure 2:
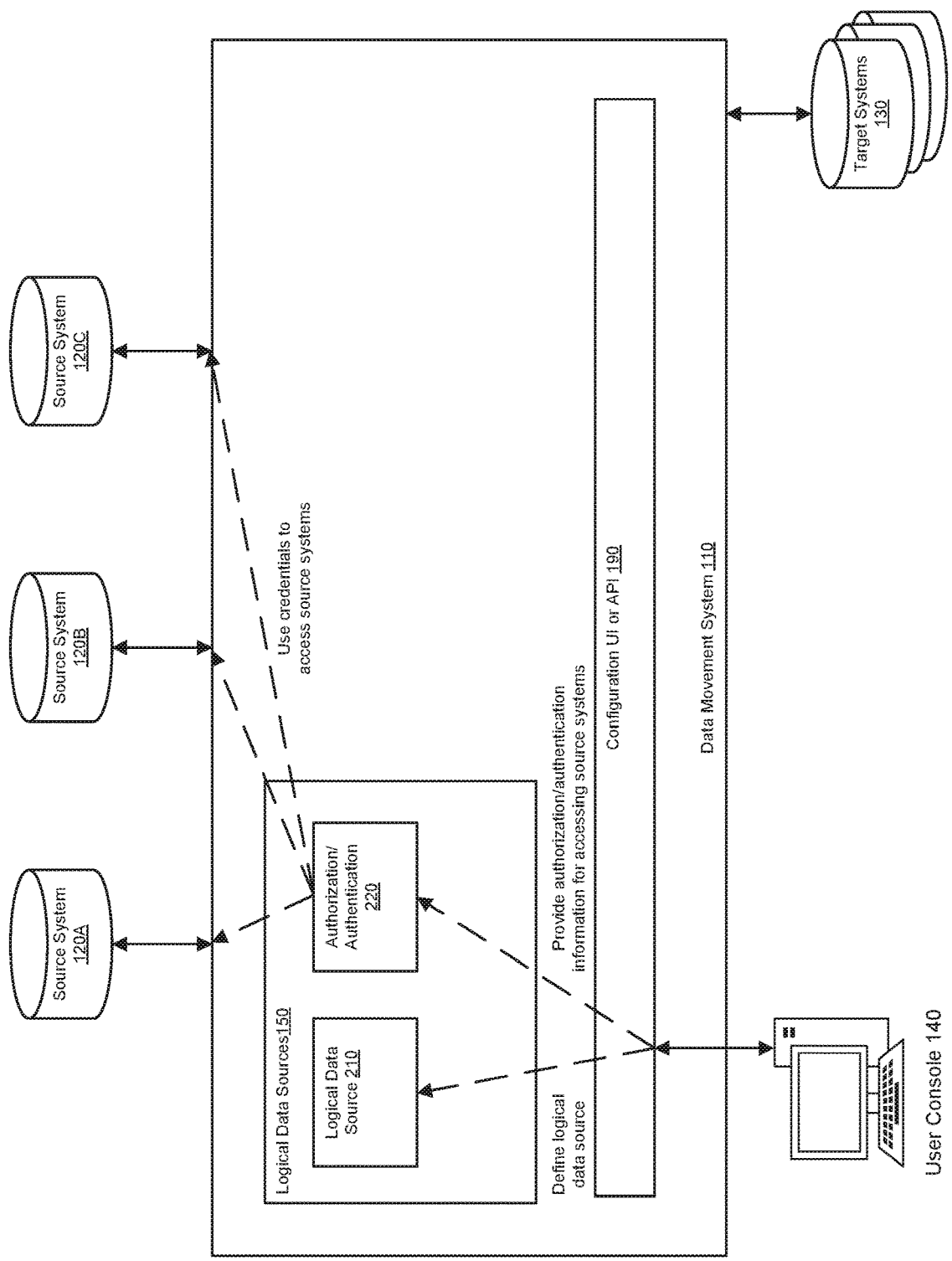
FIG. 2 is a diagram illustrating configuration of a logical data source, according to some example implementations.

FIG. 2 is a diagram illustrating configuration of a logical data source, according to some example implementations.

As shown in the diagram, a user may use the configuration UI/API 190 to define a logical data source 210 and provide authorization/authentication information 220 for accessing source systems 120 that store data associated with the logical data source to the data movement system 110. The authorization/authentication information 220 may include credentials such as a username and password combination and/or a unique identifier/token that can be used to access the source systems 120. The data movement system 110 may store information about the newly defined logical data source 210 (e.g., the name of the logical data source) and the associated authorization/authentication information 220 in a permanent storage (e.g., configuration storage 155). The data movement system 110 may use the authorization/authentication information 220 to access the respective source systems 120 (e.g., using APIs of the respective source systems 120). The user may use the configuration UI/API 190 to define additional logical data sources in a similar manner as described above.

As an example, a user may use the configuration UI/API 190 to define a logical data source 210 called "orders" and provide credentials for accessing particular systems that store order data such as an e-Commerce system, an order management system, and a data warehouse system to the data movement system 110. The data movement system may store this information in configuration storage 155 (e.g., associate the logical data source "orders" with the authorization/authentication information for accessing the e-Commerce system, the order management system, and the data warehouse system). The data movement system 110 may use these credentials to access the e-Commerce system, the order management system, and the data warehouse system.

Figure 3:
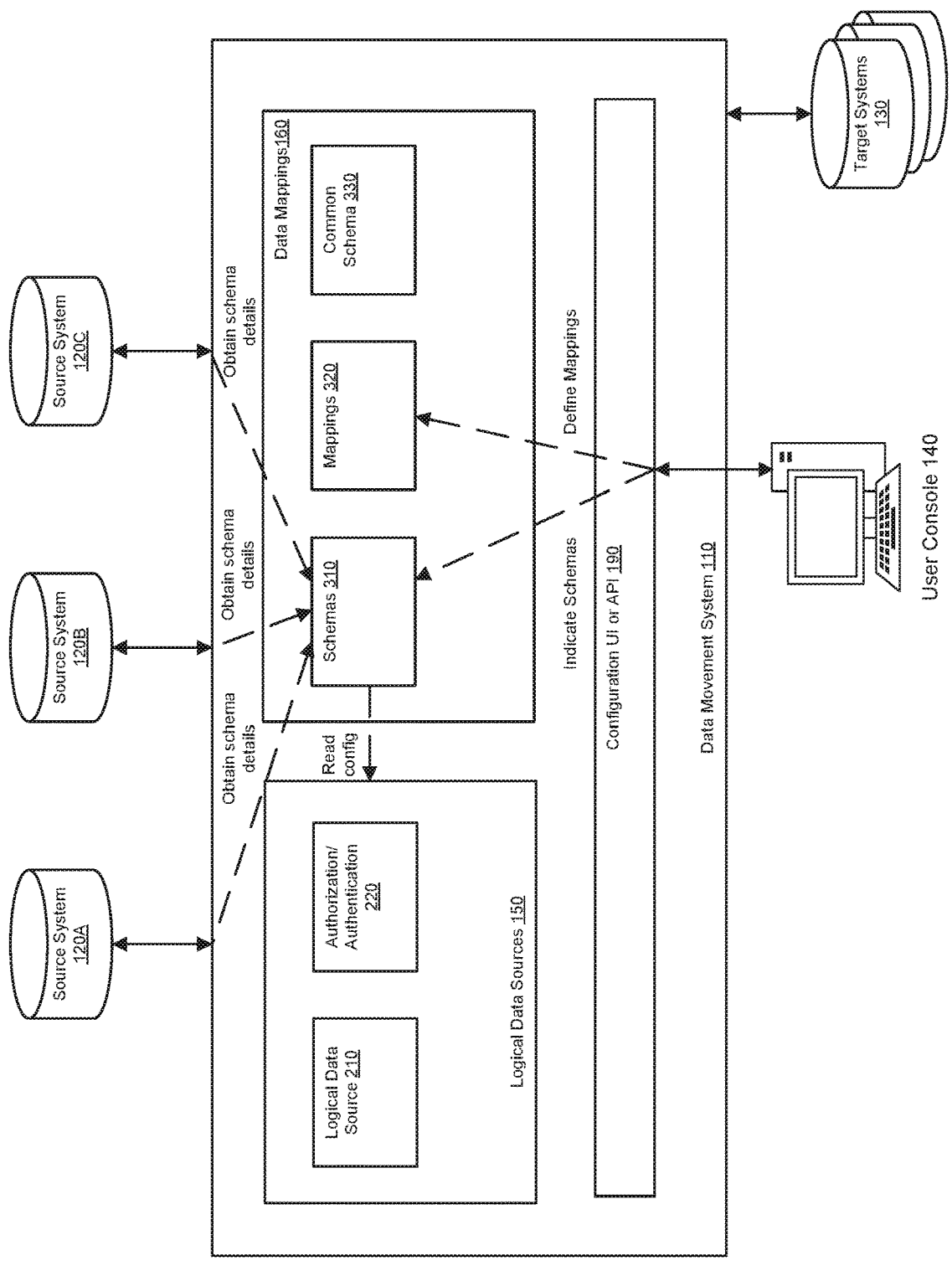
FIG. 3 is a diagram illustrating configuration of data mappings, according to some example implementations.

FIG. 3 is a diagram illustrating configuration of data mappings, according to some example implementations.

As shown in the diagram, a user may use the configuration UI/API 190 to provide an indication of the schemas 310 used by the respective source systems 120 to store data associated with the logical data source 210 to the data movement system 110. In response, the data movement system 110 may access the information about logical data source 210, including the authorization/authentication information 220, and use this information to access the source systems 120 and obtain details about the schemas 310 (e.g., the columns/fields of the respective schemas and what they represent) from the respective source systems 120. In an implementation, the user provides the details about the schemas 310 directly to the data movement system 110 (instead of the data movement system 110 obtaining the details of the schemas from the source systems 120). The data movement system 110 may store information about the schemas 310 in a permanent storage (e.g., configuration storage 165).

As an example, the user may use the configuration UI/API 190 to indicate to the data movement system 110 that the e-Commerce system uses the "Order" schema to store order data, the order management system uses the "OrdersPlaced" schema to store order data, and the data warehouse systems uses the "OrdersHistory" schema to store order data. In response, the data movement system 110 may access information about the "orders" logical data source, which includes the credentials for accessing the e-Commerce system, the order management system, and the data warehouse system. The data movement system 110 may use these credentials to access these systems and obtain details about the schemas from these systems. The data movement system may store the details about the schemas in configuration storage 165.

As an example, the details of the "Order" schema used by the e-Commerce system may be as follows:

e-Commerce—Order Schema
 "Order Number", datatype: text
 "Order Total", datatype: currency
 "Order Date", datatype: date
 "First Name", datatype: text
 "Last Name", datatype: text
 "City", datatype: text
 "State", datatype: text
 "Zip", datatype: text As an example, the details of the "OrdersPlaced" schema used by the order management system may be as follows:

Order Management—OrdersPlaced Schema
 "Order ID", datatype: text
 "Order Amount", datatype: number
 "Order Date", datatype: date
 "First Name", datatype: text
 "Surname", datatype: text
 "Shipping City", datatype: text
 "Shipping State", datatype: text
 "Shipping Zip", datatype: number As an example, the details of the "OrderHistory" schema used by the data warehouse systems may be as follows:

Data Warehouse—OrderHistory Schema
 "Order ID", datatype: text
 "Order Total Amount", datatype: Currency
 "Order Date", datatype: date
 "Name", datatype: text
 "Shipping City", datatype: text
 "Shipping State", datatype: text
 "Shipping Zip", datatype: number Also, as shown in the diagram, the user may use the configuration UI/API 190 to define mappings 320 between schemas. In an implementation, the mappings 320 including mappings between the schemas used by the source systems 120 and a common schema 330 (also referred to as a canonical schema). This way, a schema used by one system can be mapped to a schema used by another source system by going through the common schema 330 without having to define individual mappings between each of the schemas. A mapping 320 may include one-to-one column/field mappings and/or column/field mappings that involve more complex formula-like operations. For example, if one schema stores a person's full name (first name and last name) in a "name" field but another schema stores a person's first name and last name separately in a "firstName" and "lastName" field, then the mapping between the schemas may involve splitting the full name in the "name" field into first name and last name (e.g., using a space character as a delimiter) and storing the first name and last name in the "firstName" and "lastName" fields, respectively. The data movement system 110 may store information about the mappings 320 in a permanent storage (e.g., configuration storage 165).

As an example, the mappings between schemas may be as follows:
 ecomm:Order:OrderNumber→canonical:Order:OrderId
 orderMgmt:Order:OrderId→canonical:Order:OrderId
 ecomm:Order:FirstName→canonical:Order:FirstName
 ecomm:Order:LastName→canonical:Order:LastName
 orderMgmt:Order:SurName→canonical:Order:LastName
 dataWarehouse:Order:Name→SPLIT(<value>, " ", 1)→canonical:Order:FirstName<splitting the string by a space>

In the mappings above, the "OrderNumber" field of the e-Commerce order schema ("ecomm:Order") and the "Order ID" field of the order management schema ("orderMgmt:Order") both map to the "OrderID" field of the common (canonical) order schema. The "FirstName" field of the e-Commerce order schema maps to the "FirstName" field of the common order schema. The "LastName" field of the e-Commerce order schema and the "SurName" field of the order management order schema both map to the "LastName" field of the common order schema. The first portion of the "Name" field (when the value is split using the space character) of the data warehouse order schema ("dataWarehouse:Order") maps to the "FirstName" field of the common order schema. The data movement system 110 may store information about these mappings in configuration storage 165.

Figure 4:
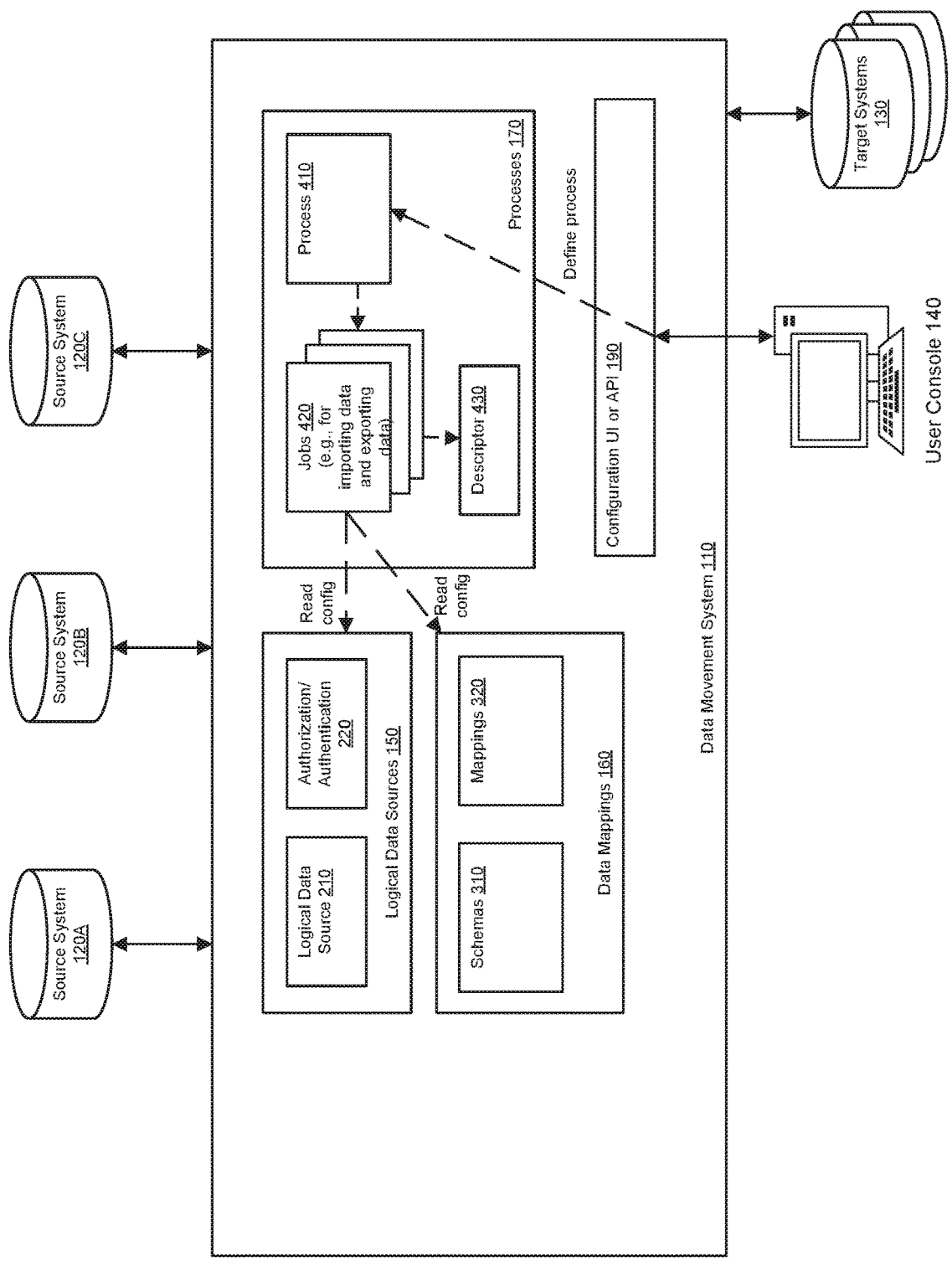
FIG. 4 is a diagram illustrating configuration of a process, according to some example implementations.

FIG. 4 is a diagram illustrating configuration of a process, according to some example implementations.

As shown in the diagram, the user may use the configuration UI/API 190 to define a process 410. The process 410 may include one or more jobs 420. In an implementation, a job 420 imports data from a source system 120 to the staging area 185. A job 420 may be defined using information previously provided by the user about logical data sources 150 and/or data mappings 160. For example, the data movement system 110 may provide a user interface that allows a user to define a job by allowing the user to select one of the logical data sources 150, select one of the systems that stores data associated with that logical data source, and select a schema/mapping for the data. In response, the data movement system 110 may create a job that imports data associated with the logical data source from the selected system to the staging area 185 (e.g., the job may use the authorization/authentication information 220 to access the selected system and use the schemas information 310 and/or mappings information 320 to know which table/columns/rows to extract and apply any necessary transformations).

In an implementation, the user may use the configuration UI/API 190 to provide a descriptor 430 to the data movement system 110. The descriptor 430 may describe where and how data imported from the source systems 120 is to be stored (e.g., it may indicate a specific folder in the staging area 185 in which imported data is to be stored and/or indicate whether the data is to be landed in its original format or in a common/canonical format). A job may refer to the descriptor 430 to indicate where/how imported data is to be stored. The data movement system 110 may store information about the newly defined process 410 in permanent storage (e.g., configuration storage 175) (e.g., so that the process can be re-used/repeated at a later time (e.g., the process can be executed on a nightly basis)). The user may use the configuration UI/API 190 to define additional processes or jobs in a similar manner as described above.

As an example, the user may use the configuration UI/API 190 to define a process to accomplish the task of importing order data from the e-Commerce system, the order management system, and the data warehouse system to a staging area 185. To do this, the user may define the process to include three jobs: a first job to import order data from the e-Commerce system to the staging area 185, a second job to import order data from the order management system to the staging area 185, and a third job to import order data from the data warehouse system to the staging area 185.

The user may define the first job by selecting the "order" logical data source, selecting the e-Commerce system, and selecting the "Order" schema. The data movement system 110 may leverage the previously provided configuration information to create the job (e.g., it can use the authorization/authentication information 220 to access the e-Commerce system, use the schemas information 310 to determine which table/rows/columns to extract data from, and use the mappings information 320 to determine how to transform the extracted data to the common format or other format). The user may perform similar steps as described above to define the second job (to import order data from the order management system) and the third job (to import order data from the data warehouse system). The data movement system 110 may store information about the process (including information about the three jobs included in the process) in configuration storage 175.

Figure 5:
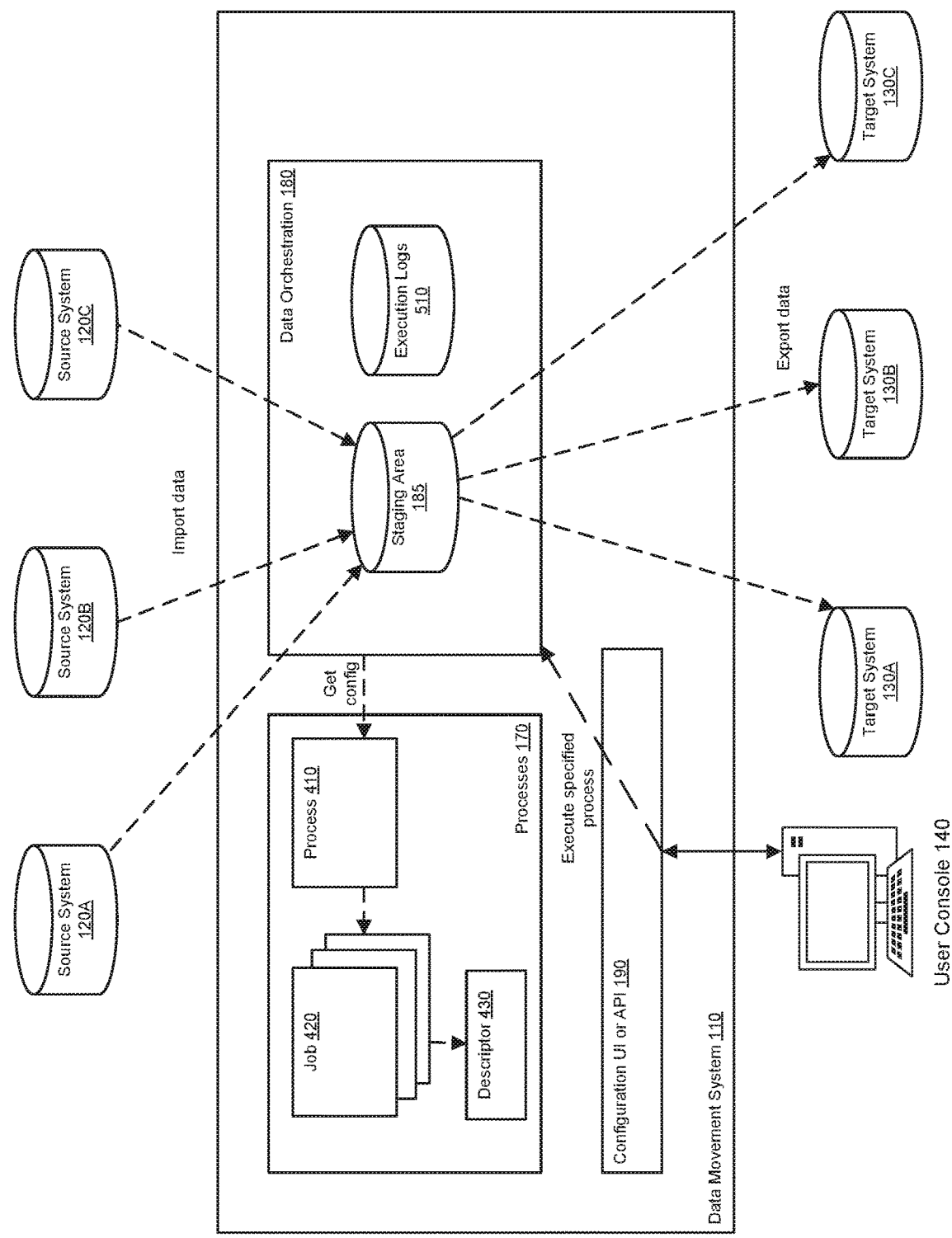
FIG. 5 is a diagram illustrating data orchestration, according to some example implementations.

FIG. 5 is a diagram illustrating data orchestration, according to some example implementations.

As shown in the diagram, the user may use the configuration UI/API 190 to instruct the data movement system 110 to execute a specified process (e.g., one of the previously defined processes such as process 410). In response, the data movement system 110 (e.g., in particular, the data orchestration component 180 of the data movement system 110) may access the information about the process 410 (e.g., from configuration storage 175), including information about the jobs 420 included in the process 410, and execute the process 410. This may involve executing the jobs 420 included in the process 410, which may involve connecting to source systems 120 using authorization/authentication information 220 and using schemas/mappings information 310 and 320 to import the appropriate data from the source systems 120 to the staging area 185 in the desired format (and possibly performing data validation and/or error handling). The staging area 184 provides a central hub into which data can be imported from source systems 120 and then exported to the target systems 130.

As an example, the user may use the configuration UI/API 190 to instruct the data movement system 110 to execute process 410 to import order data from the e-Commerce system, the order management system, and the data warehouse system to the staging area 185. In response, the data movement system 110 may obtain information about the process 410 from configuration storage 175 and execute the process 410 accordingly. This may involve executing the first job of the process, which involves connecting to the e-Commerce system and importing order data from the e-Commerce system to the staging area 185, executing the second job of the process, which involves connecting to the order management system and importing order data from the order management system to the staging area 185, and executing the third job of the process, which involves connecting to the data warehouse system and importing order data from the data warehouse system to the staging area 185.

In an implementation, a process may also include jobs for exporting data from the staging area 185 to one or more target systems 130. As an example, the process 410 may include a job to export order data from the staging area 185 to the machine learning system, another job to export order data from the staging area 185 to the analytics system, and yet another job to export order data from the staging area 185 to the data management system.

In an implementation, the data orchestration component 180 stores execution logs 510 that log various information about the processes/jobs executed by the data orchestration component 180 (e.g., process/job IDs, execution times, indications of whether execution was successful or not, details of any errors that occurred during execution, etc.).

Figure 6:
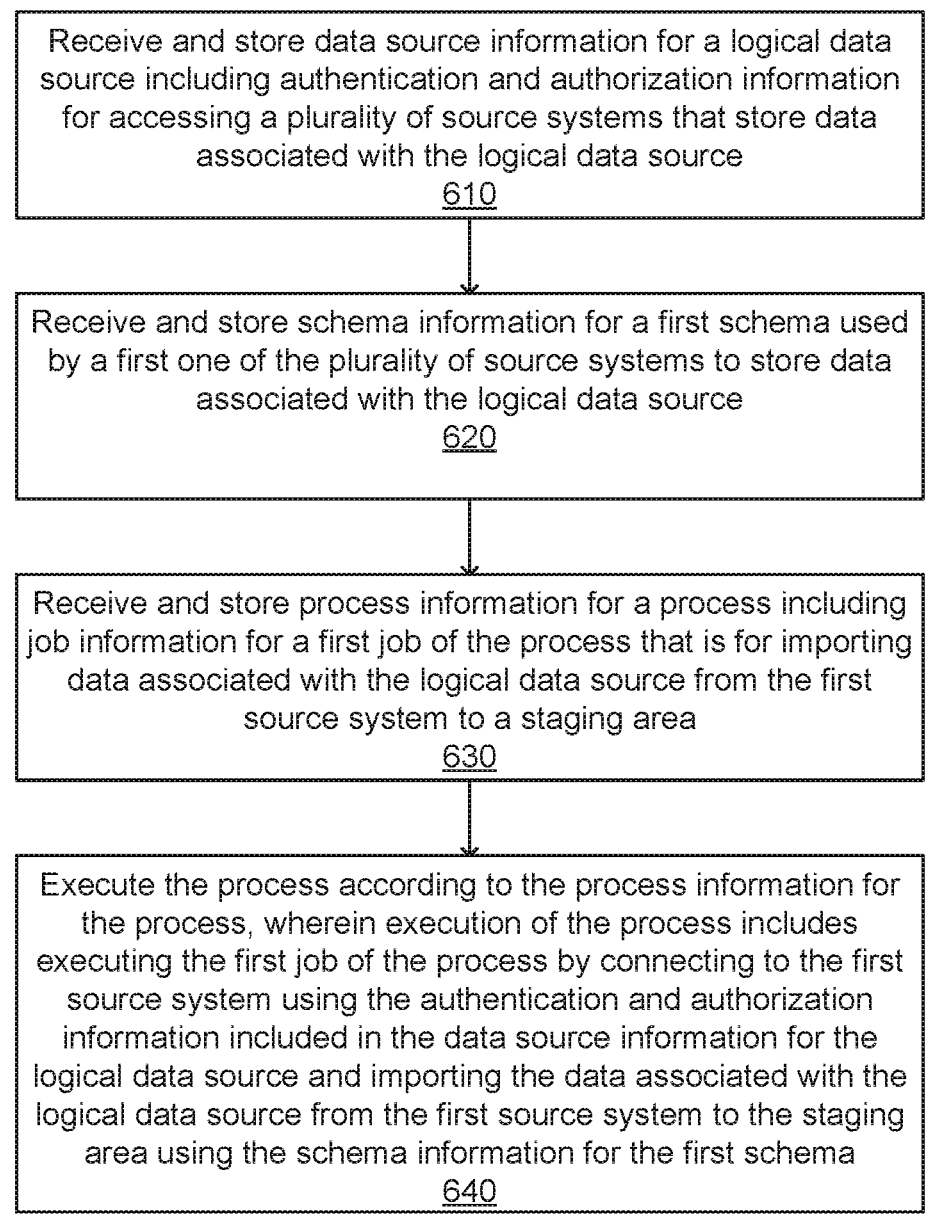
FIG. 6 is a flow diagram illustrating a process for standardizing and centralizing data movement between systems, according to some example implementations.

FIG. 6 is a flow diagram illustrating a process for standardizing and centralizing data movement between systems, according to some example implementations. In an implementation, the process is implemented by one or more computing devices implementing a data movement system.

At block 610, the one or more computing devices receive and store data source information for a logical data source including authentication and authorization information for accessing a plurality of source systems that store data associated with the logical data source.

At block 620, the one or more computing devices receive and store schema information for a first schema used by a first one of the plurality of source systems to store data associated with the logical data source.

At block 630, the one or more computing devices receive and store process information for a process including job information for a first job of the process that is for importing data associated with the logical data source from the first source system to a staging area. In an implementation, the process information for the process further includes job information for a second job of the process that is for exporting data stored in the staging area to a target system. In an implementation, the execution of the process further includes executing the second job of the process by connecting to the target system and exporting the data stored in the staging area to the target system.

At block 640, the one or more computing devices execute the process according to the process information for the process, wherein execution of the process includes executing the first job of the process by connecting to the first source system using the authentication and authorization information included in the data source information for the logical data source and importing the data associated with the logical data source from the first source system to the staging area using the schema information for the first schema. In an implementation, execution of the first job includes validating the data imported from the first source system using the schema information for the first schema.

In an implementation, the one or more computing devices receive and store schema information for a second schema used by the second one of the plurality of source systems to store data associated with the logical data source. In an implementation, the process information for the process further includes job information for a second job of the process that is for importing data associated with the logical data source from the second source system to the staging area. In an implementation, the execution of the process further includes executing the second job of the process by connecting to the second source system using the authentication and authorization information included in the data source information for the logical data source and importing the data associated with the logical data source from the second source system to the staging area using the schema information for the second schema. In an implementation, the one or more computing devices receive mapping information for a first mapping between the first schema and a common (canonical) schema and mapping information for a second mapping between the second schema and the common schema. In an implementation, execution of the first job includes using the mapping information for the first mapping to transform the data imported from the first source system to a common format and execution of the second job includes using the mapping information for the second mapping to transform the data imported from the second source system to the common format.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 7A:
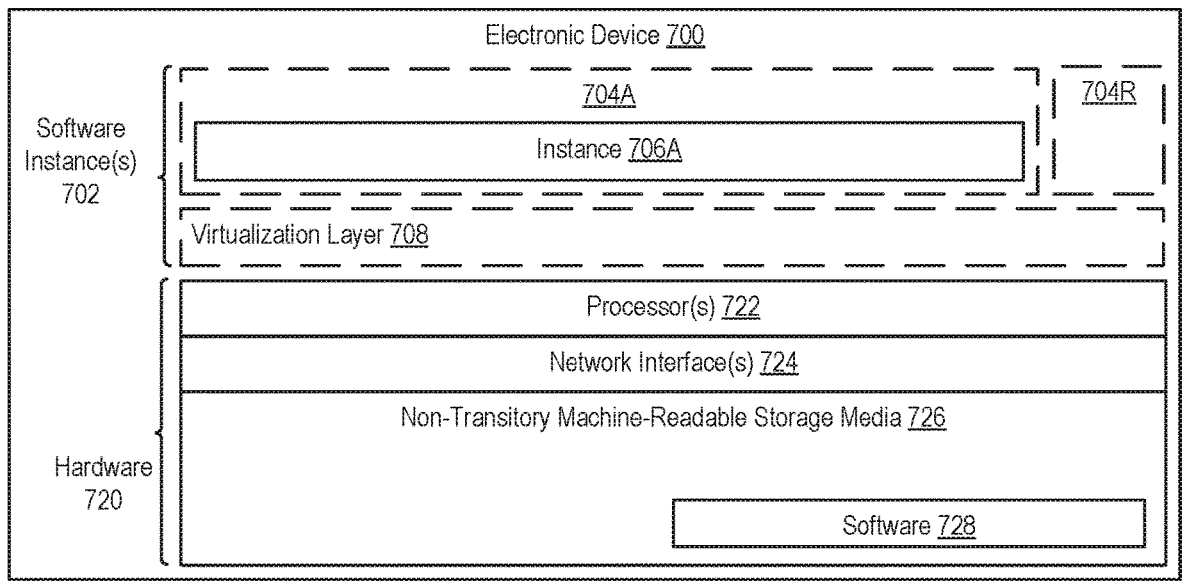
FIG. 7A is a block diagram illustrating an electronic device according to some example implementations.

FIG. 7A is a block diagram illustrating an electronic device 700 according to some example implementations. FIG. 7A includes hardware 720 comprising a set of one or more processor(s) 722, a set of one or more network interfaces 724 (wireless and/or wired), and machine-readable media 726 having stored therein software 728 (which includes instructions executable by the set of one or more processor(s) 722). The machine-readable media 726 may include non-transitory and/or transitory machine-readable medium/media. Each of the previously described clients and the data movement service may be implemented in one or more electronic devices 700. In one implementation: 1) each of the clients is implemented in a separate one of the electronic devices 700 (e.g., in end user devices where the software 728 represents the software to implement clients to interface directly and/or indirectly with the data movement service (e.g., software 728 represents a web browser, a native client, a portal, a command-line interface, and/or an application programming interface (API) based upon protocols such as Simple Object Access Protocol (SOAP), Representational State Transfer (REST), etc.)); 2) the data movement service is implemented in a separate set of one or more of the electronic devices 700 (e.g., a set of one or more server devices where the software 728 represents the software to implement the data movement service); and 3) in operation, the electronic devices implementing the clients and the data movement service would be communicatively coupled (e.g., by a network) and would establish between them (or through one or more other layers and/or or other services) connections for submitting data movement configuration information (e.g., information about logical data sources 150, data mappings 160, and processes 170) to the data movement service and returning responses (e.g., an indication of success/failure) to the clients. Other configurations of electronic devices may be used in other implementations (e.g., an implementation in which the client and the data movement service are implemented on a single one of electronic device 700).

During operation, an instance of the software 728 (illustrated as instance 706 and referred to as a software instance; and in the more specific case of an application, as an application instance) is executed. In electronic devices that use compute virtualization, the set of one or more processor(s) 722 typically execute software to instantiate a virtualization layer 708 and one or more software container(s) 704A-704R (e.g., with operating system-level virtualization, the virtualization layer 708 may represent a container engine (such as Docker Engine by Docker, Inc. or rkt in Container Linux by Red Hat, Inc.) running on top of (or integrated into) an operating system, and it allows for the creation of multiple software containers 704A-704R (representing separate user space instances and also called virtualization engines, virtual private servers, or jails) that may each be used to execute a set of one or more applications; with full virtualization, the virtualization layer 708 represents a hypervisor (sometimes referred to as a virtual machine monitor (VMM)) or a hypervisor executing on top of a host operating system, and the software containers 704A-704R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 728 is executed within the software container 704A on the virtualization layer 708. In electronic devices where compute virtualization is not used, the instance 706 on top of a host operating system is executed on the "bare metal" electronic device 700. The instantiation of the instance 706, as well as the virtualization layer 708 and software containers 704A-704R if implemented, are collectively referred to as software instance(s) 702.

Alternative implementations of an electronic device may have numerous variations from that described above. For example, customized hardware and/or accelerators might also be used in an electronic device.

Example Environment

Figure 7B:
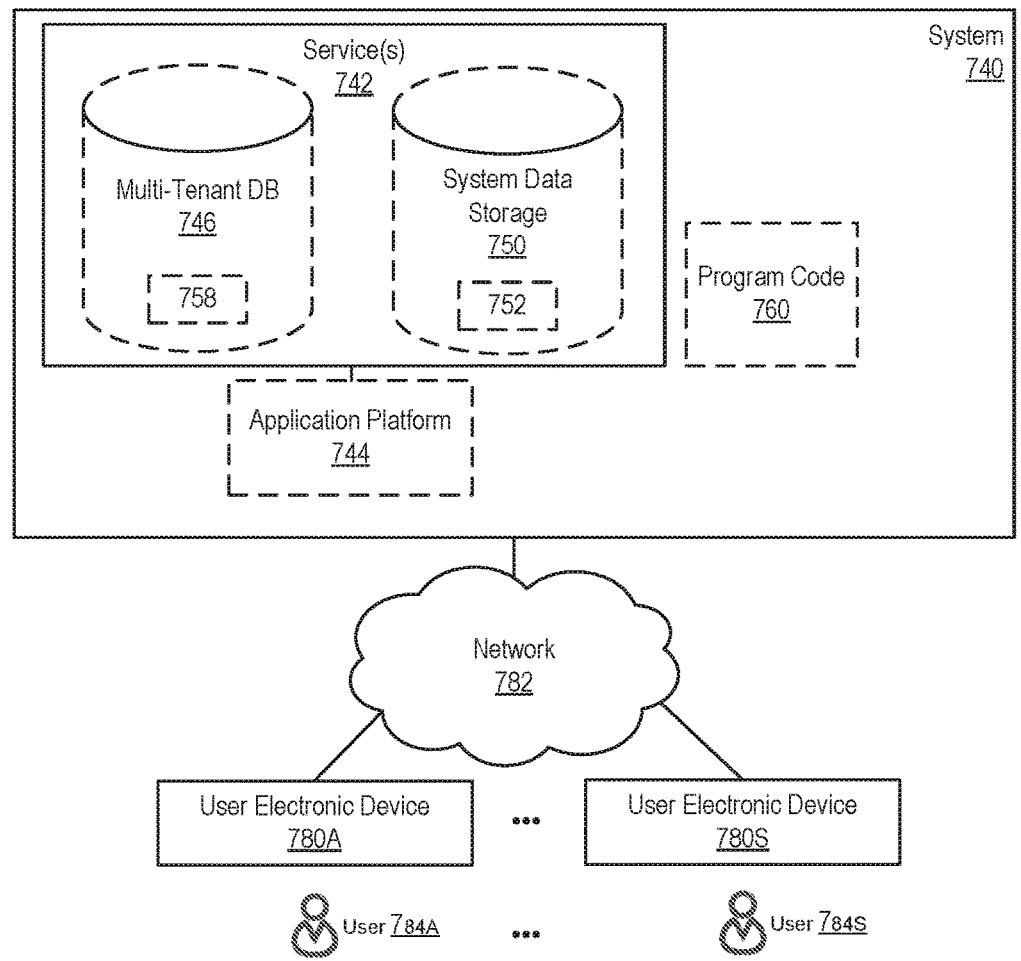
FIG. 7B is a block diagram of a deployment environment according to some example implementations.

FIG. 7B is a block diagram of a deployment environment according to some example implementations. A system 740 includes hardware (e.g., a set of one or more server devices) and software to provide service(s) 742, including the data movement service. In some implementations the system 740 is in one or more datacenter(s). These datacenter(s) may be: 1) first party datacenter(s), which are datacenter(s) owned and/or operated by the same entity that provides and/or operates some or all of the software that provides the service(s) 742; and/or 2) third-party datacenter(s), which are datacenter(s) owned and/or operated by one or more different entities than the entity that provides the service(s) 742 (e.g., the different entities may host some or all of the software provided and/or operated by the entity that provides the service(s) 742). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 740 is coupled to user devices 780A-780S (e.g., a user console 140) over a network 782. The service(s) 742 may be on-demand services that are made available to one or more of the users 784A-784S working for one or more entities other than the entity which owns and/or operates the on-demand services (those users sometimes referred to as outside users) so that those entities need not be concerned with building and/or maintaining a system, but instead may make use of the service(s) 742 when needed (e.g., when needed by the users 784A-784S). The service(s) 742 may communicate with each other and/or with one or more of the user devices 780A-780S via one or more APIs (e.g., a REST API). In some implementations, the user devices 780A-780S are operated by users 784A-784S, and each may be operated as a client device and/or a server device. In some implementations, one or more of the user devices 780A-780S are separate ones of the electronic device 700 or include one or more features of the electronic device 700.

In some implementations, the system 740 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 740 is a multi-tenant cloud computing architecture supporting multiple services, such as one or more of the following types of services: data movement service 742, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 740 may include an application platform 744 that enables PAAS for creating, managing, and executing one or more applications developed by the provider of the application platform 744, users accessing the system 740 via one or more of user devices 780A-780S, or third-party application developers accessing the system 740 via one or more of user devices 780A-780S.

In some implementations, one or more of the service(s) 742 may use one or more multi-tenant databases 746, as well as system data storage 750 for system data 752 accessible to system 740. In certain implementations, the system 740 includes a set of one or more servers that are running on server electronic devices and that are configured to handle requests for any authorized user associated with any tenant (there is no server affinity for a user and/or tenant to a specific server). The user devices 780A-780S communicate with the server(s) of system 740 to request and update tenant-level data and system-level data hosted by system 740, and in response the system 740 (e.g., one or more servers in system 740) automatically may generate one or more Structured Query Language (SQL) statements (e.g., one or more SQL queries) that are designed to access the desired information from the multi-tenant database(s) 746 and/or system data storage 750.

In some implementations, the service(s) 742 are implemented using virtual applications dynamically created at run time responsive to queries from the user devices 780A-780S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 760 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 744 includes an application setup mechanism that supports application developers' creation and management of applications, which may be saved as metadata by save routines. Invocations to such applications, including the data movement service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 782 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 740 and the user devices 780A-780S.

Each user device 780A-780S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 740. For example, the user interface device can be used to access data and applications hosted by system 740, and to perform searches on stored data, and otherwise allow one or more of users 784A-784S to interact with various GUI pages that may be presented to the one or more of users 784A-784S. User devices 780A-780S might communicate with system 740 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 780A-780S might include an HTTP client, commonly referred to as a "browser," for sending and receiving HTTP messages to and from server(s) of system 740, thus allowing users 784A-784S of the user devices 780A-780S to access, process and view information, pages and applications available to it from system 740 over network 782.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method by one or more computing devices implementing a data movement system to standardize and centralize data movement between systems, the method comprising:

receiving and storing data source information for a logical data source including authentication and authorization information for accessing a plurality of source systems that store data associated with the logical data source, wherein the logical data source is a logical representation of data stored across the plurality of source systems representing a same thing but stored using different schemas;

receiving and storing schema information for a first schema used by a first one of the plurality of source systems to store data associated with the logical data source;

receiving and storing schema information for a second schema used by a second one of the plurality of source systems to store data associated with the logical data source;

receiving and storing mapping information for a first mapping between the first schema and a common schema;

receiving and storing mapping information for a second mapping between the second schema and the common schema;

receiving and storing process information for a process including job information for a first job of the process that is for importing data associated with the logical data source from the first source system to a staging area, job information for a second job of the process that is for importing data associated with the logical data source from the second source system to the staging area, and job information for a third job of the process that is for exporting data stored in the staging area to a target system, wherein the process information for the process is received based on a user selection of the logical data source; and executing the process according to the process information for the process, wherein the execution of the process includes executing the first job of the process by connecting to the first source system using the authentication and authorization information included in the data source information for the logical data source and importing data associated with the logical data source from the first source system to the staging area in a common format using the mapping information for the first mapping, executing the second job of the process by connecting to the second source system using the authentication and authorization information included in the data source information for the logical data source and importing data associated with the logical data source from the second source system to the staging area in the common format using the mapping information for the second mapping, and executing the third job of the process by exporting the data imported from the first source system and the second source system to the target system using mapping information for a third mapping between the common schema and a third schema used by the target system.

2. The method of claim 1, wherein the mapping information for the first mapping is used to transform the data associated with the logical data source stored in the first source system to the common format and the mapping information for the second mapping is used to transform the data associated with the logical data source stored in the second source system to the common format.

3. The method of claim 1, wherein the execution of the first job includes validating the data associated with the logical data source stored in the first source system using the schema information for the first schema.

4. The method of claim 1, wherein the execution of the third job of the process includes connecting to the target system.

5. A non-transitory machine-readable storage medium that provides instructions that, if executed by one or more processors of one or more computing devices implementing a data movement system, are configurable to cause the data movement system to perform operations for standardizing and centralizing data movement between systems, the operations comprising:
receiving and storing data source information for a logical data source including authentication and authorization information for accessing a plurality of source systems that store data associated with the logical data source, wherein the logical data source is a logical representation of data stored across the plurality of source systems representing a same thing but stored using different schemas;
receiving and storing schema information for a first schema used by a first one of the plurality of source systems to store data associated with the logical data source;
receiving and storing schema information for a second schema used by a second one of the plurality of source systems to store data associated with the logical data source;
receiving and storing mapping information for a first mapping between the first schema and a common schema;
receiving and storing mapping information for a second mapping between the second schema and the common schema;
receiving and storing process information for a process including job information for a first job of the process that is for importing data associated with the logical data source from the first source system to a staging area, job information for a second job of the process that is for importing data associated with the logical data source from the second source system to the staging area, and job information for a third job of the process that is for exporting data stored in the staging area to a target system, wherein the process information for the process is received based on a user selection of the logical data source; and
executing the process according to the process information for the process, wherein the execution of the process includes executing the first job of the process by connecting to the first source system using the authentication and authorization information included in the data source information for the logical data source and importing data associated with the logical data source from the first source system to the staging area in a common format using the mapping information for the first mapping, executing the second job of the process by connecting to the second source system using the authentication and authorization information included in the data source information for the logical data source and importing data associated with the logical data source from the second source system to the staging area in the common format using the mapping information for the second mapping, and executing the third job of the process by exporting the data imported from the first source system and the second source system to the target system using mapping information for a third mapping between the common schema and a third schema used by the target system.

6. The non-transitory machine-readable storage medium of claim 5, wherein the mapping information for the first mapping is used to transform the data associated with the logical data source stored in the first source system to the common format and the mapping information for the second mapping is used to transform the data associated with the logical data source stored in the second source system to the common format.

7. The non-transitory machine-readable storage medium of claim 5, wherein the execution of the first job includes validating the data associated with the logical data source stored in the first source system using the schema information for the first schema.

8. An apparatus comprising:
one or more processors; and
a non-transitory machine-readable storage medium that provides instructions that, if executed by the one or more processors, are configurable to cause the apparatus to implement a data movement system that performs operations for standardizing and centralizing data movement between systems, the operations comprising:
receiving and storing data source information for a logical data source including authentication and authorization information for accessing a plurality of source systems that store data associated with the logical data source, wherein the logical data source is a logical representation of data stored across the plurality of source systems representing a same thing but stored using different schemas;
receiving and storing schema information for a first schema used by a first one of the plurality of source systems to store data associated with the logical data source;
receiving and storing schema information for a second schema used by a second one of the plurality of source systems to store data associated with the logical data source;
receiving and storing mapping information for a first mapping between the first schema and a common schema;
receiving and storing mapping information for a second mapping between the second schema and the common schema;
receiving and storing process information for a process including job information for a first job of the process that is for importing data associated with the logical data source from the first source system to a staging area, job information for a second job of the process that is for importing data associated with the logical data source from the second source system to the staging area, and job information for a third job of the process that is for exporting data stored in the staging area to a target system, wherein the process information for the process is received based on a user selection of the logical data source; and
executing the process according to the process information for the process, wherein the execution of the process includes executing the first job of the process by connecting to the first source system using the authentication and authorization information included in the data source information for the logical data source and importing the data associated with the logical data source from the first source system to the staging area in a common format using the mapping information for the first mapping, executing the second job of the process by connecting to the second source system using the authentication and authorization information included in the data source information for the logical data source and importing data associated with the logical data source from the second source system to the staging area in the common format using the mapping information for the second mapping, and executing the third job of the process by exporting the data imported from the first source system and the second source system to the target system using mapping information for a third mapping between the common schema and a third schema used by the target system.

9. The apparatus of claim 8, wherein the mapping information for the first mapping is used to transform the data associated with the logical data source stored in the first source system to the common format and the mapping information for the second mapping is used to transform the data associated with the logical data source stored in the second source system to the common format.

10. The apparatus of claim 8, wherein the execution of the first job includes validating the data associated with the logical data source stored in the first source system using the schema information for the first schema.

\* \* \* \* \*